United States Patent
Cox

(10) Patent No.: US 6,567,382 B1
(45) Date of Patent: May 20, 2003

(54) MAXIMAL FLOW DATA ROUTING

(75) Inventor: Michael Cox, New South Wales (AU)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/371,503

(22) Filed: Aug. 10, 1999

(30) Foreign Application Priority Data

Sep. 7, 1998 (AU) ............................................. PP 5714

(51) Int. Cl.[7] ............................................. H04L 12/56
(52) U.S. Cl. ........................ 370/255; 370/400; 370/468
(58) Field of Search ................................ 370/254, 255, 370/256, 257, 400, 401, 406, 407, 408, 410, 465, 468, 230, 230.1, 236, 536

(56) References Cited

U.S. PATENT DOCUMENTS

| | | | | |
|---|---|---|---|---|
| 5,495,426 A | * | 2/1996 | Waclawsky et al. | 364/514 |
| 5,596,722 A | * | 1/1997 | Rahnema | 395/200.15 |
| 6,081,511 A | * | 6/2000 | Carr et al. | 370/256 |
| 6,178,448 B1 | * | 1/2001 | Gray et al. | 709/224 |
| 6,347,078 B1 | * | 2/2002 | Narvaez-Guarnieri et al. | 370/230 |
| 6,256,295 B1 | * | 7/2002 | Calon | 370/254 |

* cited by examiner

Primary Examiner—Min Jung
(74) Attorney, Agent, or Firm—Sughrue Mion, PLLC

(57) ABSTRACT

In a network consisting of a plurality of nodes interconnected by links, a communication from one terminal to a second terminal is transmitted using a maximal flow algorithm, in which the communication is divided among all the possible paths from the first terminal to the second terminal. Accordingly, greater use is made of lightly loaded links and the demand on heavily loaded links is reduced as the traffic is more evenly distributed across the network, resulting in an overall improvement in network performance.

17 Claims, 2 Drawing Sheets

MAXIMAL FLOW DATA ROUTING

TECHNICAL FIELD

This invention relates to a technique for improving the routing of data traffic in a network.

BACKGROUND ART

There are a number of techniques for routing data.

A first technique uses a distance vector. In this technique each router maintains a list of destinations which can be reached in one "hop" from the corresponding router. Each router notifies a requesting router in the network of its access to the requested destination so a path to the destination can be established.

A problem with this technique is that loops can be formed.

The BGP4 protocol is a modified distance vector technique which solves the loop problem by deleting duplicate routes.

In the link state protocol (LSP), each router notifies all other routers directly attached to the router. This enables each router to build a graphical topological map of the network so that each router knows the structure of the network.

The Open Shortest Path First (OSPF) protocol looks for the least cost shortest path for the transmission of data from a source to a destination. All the data is transmitted over a single path.

The Equal Cost Multiple Path (ECMP) protocol improves on the transmission speed of OSPF by identifying all paths of equal cost and dividing the traffic equally among these paths. A drawback of this technique is that it does not take account of the load status of each of the paths so equal amounts of the data traffic are distributed to lightly loaded and heavily loaded links. Thus this system does not make optimal use of the network and it can add to congestion on the heavily loaded links.

Optimized Multipath (OMP) improves on ECMP by dynamically adjusting the traffic allocated to links on the basis of the network load distribution.

DISCLOSURE OF THE INVENTION

It is desirable to provide a technique which improves on the utilization of the network made by the prior art.

Accordingly this specification discloses a method of transmitting data across a network which includes a plurality of routers, the method including providing each router with a map of the topology of the network, wherein the transmitting host router identifies all useable paths between a transmitting terminal and at least one destination terminal, and wherein the transmitting host router distributes the data message among the useable paths so the choice of paths is not limited to the shortest paths.

In a preferred embodiment, the transmitting host router identifies at least all the shortest paths and distributes the data amongst a plurality of these paths inversely to their load status.

In a further embodiment, the transmitting host router identifies at least the shortest paths and the next shortest paths and distributes the data amongst a plurality of these paths inversely to their load status.

In these embodiments the transmitting host selects two or more paths, but not necessarily all the paths, to carry the data. Paths with a traffic load exceeding a predetermined threshold are not selected. Thus the system can help to avoid overloading the network by choosing the more lightly loaded links.

In a further embodiment, the transmitting host receives information on the load distribution across the network and dynamically allocates the data message to the paths according to the load of the paths.

In an alternative embodiment each router through which a portion of the data message passes reallocates the portion of the data message on the basis of current network load conditions.

In a further embodiment the host router subdivides the data message according to network specifications.

The different paths may have different different delays. In distributing the data across several links, it is necessary that the individual blocks of data are given a sequence stamp at the time they are split up, to enable them to be reassembled in the correct sequence at the destination.

BRIEF DESCRIPTION OF THE DRAWINGS

The invention will be described with reference to the accompanying drawings, in which.

BEST MODE OF CARRYING OUT THE INVENTION

Figure 1:
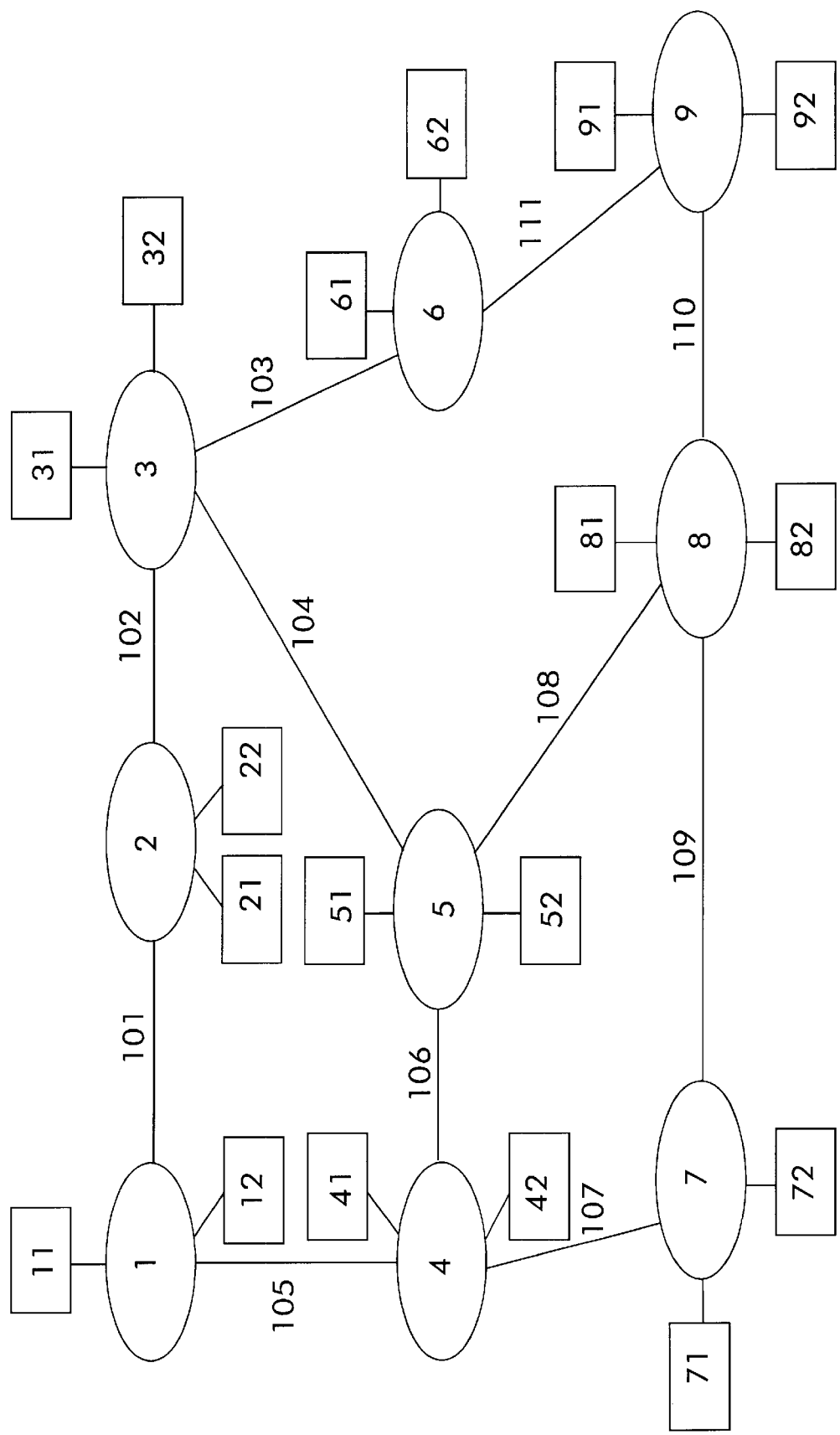
FIG. 1 is a schematic representation of a network in which the invention may be applied.

FIG. 1 shows a network in which the invention may be utilized. The network includes a plurality of interlinked routers, 1 . . . 9, to which a plurality of data terminals are connected. The routers are interconnected by paths 101 . . . 111.

According to the invention, the routers in the network are configured to implement a Maximal Flow Protocol (MFP), and, to this end, each router contains a map of the network topology enabling it to identify all possible paths to a destination terminal.

The operation of the system embodying the invention will be described by assuming that data is to be transmitted from terminal 11 to terminal 92.

The router 1 which hosts transmitting terminal 11 identifies the available paths between terminal 11 and terminal 92. The paths include:

| Path 1 | | | | | | | | |
|---|---|---|---|---|---|---|---|---|
| Terminal | 1 | | 2 | | 3 | | 6 | 9 |
| Link | | 101 | | 102 | | 103 | | 111 |
| Path 2 | | | | | | | | |
| Terminal | 1 | | 4 | | 5 | | 8 | 9 |

-continued

| | | | | | | | | | | | | | | | |
|---|---|---|---|---|---|---|---|---|---|---|---|---|---|---|---|
| Link | | 105 | | 106 | | 108 | | 110 | | | | | | | |
| Path 3 | | | | | | | | | | | | | | | |
| Terminal | 1 | | 4 | | 7 | | 8 | | 9 | | | | | | |
| Link | | 105 | | 107 | | 109 | | 110 | | | | | | | |
| Path 4 | | | | | | | | | | | | | | | |
| Terminal | 1 | | 2 | | 3 | | 5 | | 8 | | 9 | | | | |
| Link | | 101 | | 102 | | 104 | | 108 | | 110 | | | | | |
| Path 5 | | | | | | | | | | | | | | | |
| Terminal | 1 | | 2 | | 3 | | 5 | | 4 | | 7 | | 8 | | 9 |
| Link | | 101 | | 102 | | 104 | | 106 | | 107 | | 109 | | 110 | |
| Path 6 | | | | | | | | | | | | | | | |
| Terminal | 1 | | 4 | | 5 | | 3 | | 6 | | 9 | | | | |
| Link | | 105 | | 106 | | 104 | | 103 | | 111 | | | | | |
| Path 7 | | | | | | | | | | | | | | | |
| Terminal | 1 | | 4 | | 7 | | 8 | | 5 | | 3 | | 6 | | 9 |
| Link | | 105 | | 107 | | 109 | | 108 | | 104 | | 103 | | 111 | |

It is to be noted that paths 1, 2 and 3 each contain 4 "hops" and these are the equal shortest links which would be chosen by the ECMP technique.

OMP would look at the loading of the links in paths 1,2 and 3 and distribute the data traffic in inverse relation to the loading of the most heavily loaded link of each of these paths.

The Maximal Flow Protocol (MFP) used in the invention, however, recognizes that there are additional paths with additional traffic carrying capacity between terminal 11 and terminal 92, and takes advantage of this fact to distribute the load more evenly over the network. If P is chosen as the size of the minimum data packet and M is the size of the message, the message can be divided into M/P packets. Thus the message can be distributed over up to M/P links. The number of links used and the distribution between them is decided on the basis of the load on the links.

In a preferred embodiment of the invention the load is assigned to the MFP paths dynamically according to the traffic loads on the links of each path. For example, assume that links 102 & 109 are operating at near full capacity, say 90%, and that the other links are operating at 50% capacity. This means that links 102 and 109 are potential bottlenecks in all the paths from terminal 11 to terminal 92 which include either or both these links. It can be seen from path charts above that link 102 is included in paths 1,4 and 5, and link 109 is included in paths 3,5 and 7. Thus the load on these links acts to limit available capacity on paths 1,3,4,5 and 7. However paths 2 and 6 both have more lightly loaded links, and are thus capable of carrying more of the new traffic than the other links. On the assumptions above, both paths 2 and 6 should be allocated more of the new traffic than the other paths.

An advantage of the MFP technique is that the load can be distributed more evenly across the network, and this helps to reduce the occurrence of bottlenecks and provides more efficient utilization of the network.

Of course, the traffic from a terminal is not infinitely divisible, so that, where there are a very large number of possible paths, the traffic may be distributed over only some of the paths, preferably starting with the least heavily loaded.

Another factor to consider in distributing the traffic is that the network parameters may specify a minimum size of data packet, and this would impose a limit on the number of paths over which the data can be distributed.

Figure 2:
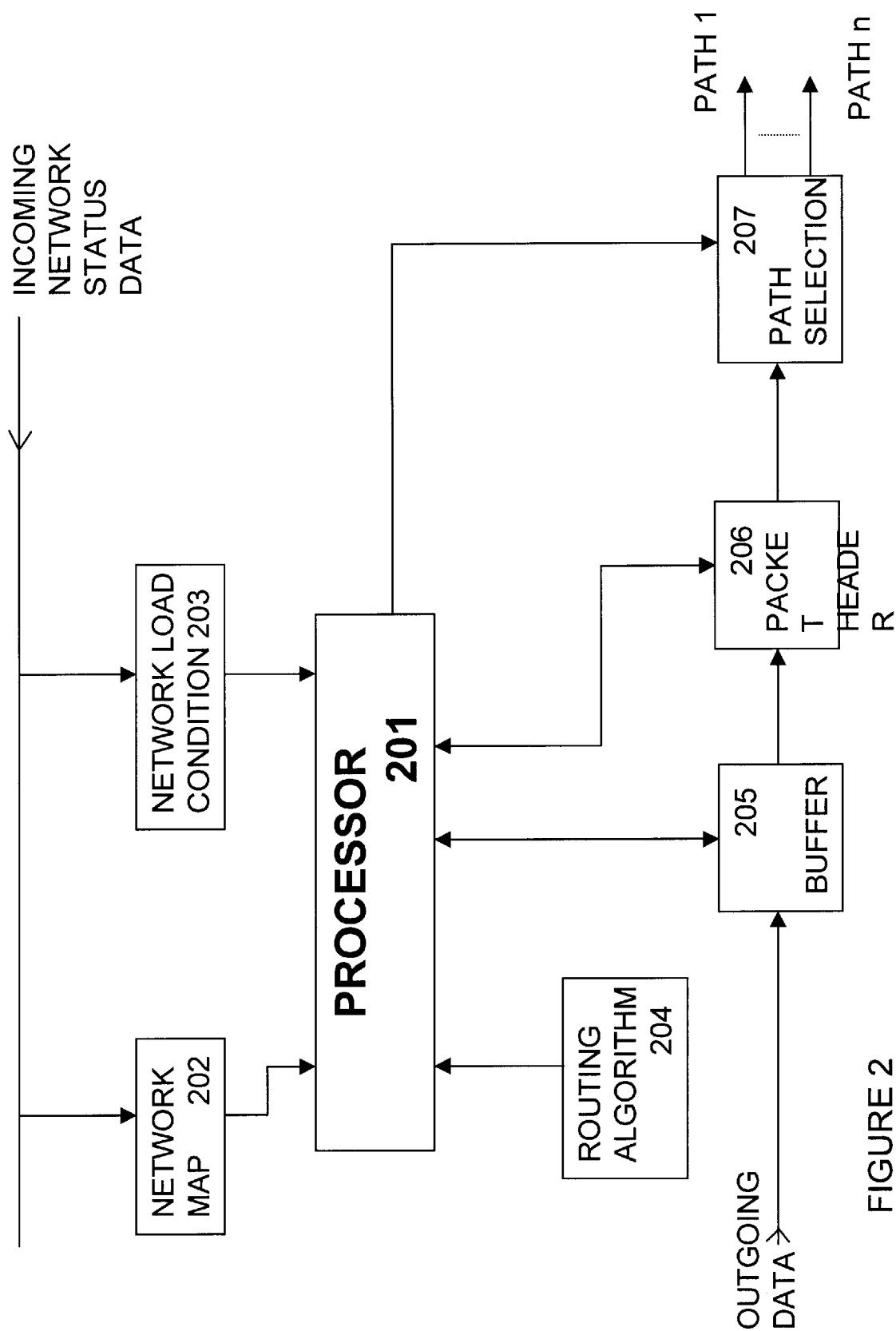
FIG. 2 is a block diagram illustrating functional elements of a router embodying the invention.

FIG. 2 is a block diagram illustrating functional elements of a router embodying the invention.

The router includes a processor 201 which receives network status information, eg. in the form of network topography 202 detailing the nodes and links of the network, and network load conditions 203 which shows the load status of the nodes and links. The network map data would be fairly static, only changing when there is a faulty link or node, or when new links and nodes are added. The network load status changes as the network usage varies throughout the day.

When the router receives a message, the message is stored in buffer 205, and the router examines its destination information in the header of the data to determine where the message is to be sent. The destination information is used in conjunction with the network map to identify the practical paths from the router to the destination. The status of the nodes and links of the paths is then analysed to determine over which paths the message is to be distributed. Preferably the message is distributed over the paths in proportion to the vacant load carrying capacity of the paths. The message is divided into packets and the necessary packet handling information is applied in packet header means 206. In the packet header means 206, the source/destination information, message identification packet sequence information (eg. a time stamp) and packet size, for example, is added to facilitate re-assembly of the message. The distribution of the packets is carried out on the basis of routing algorithm 204 which utilizes the network topography 202 and network load status 203 to determine the spread of the load over the available practical paths.

In one embodiment, the network load status information indicates which of the range of local conditions a link or node is in eg: $\leq 30\%$; $>30\% \leq 50\%$; $>50\% \leq 70\%$; $>70\%$. This limits the amount of status reporting data which needs to be transmitted.

The claims defining the invention are as follows:

1. A method of transmitting a data message across a network comprising a plurality of routers, wherein the method comprises:

providing each router with a topology map of the network, wherein the transmitting host router identifies all useable paths between a transmitting terminal and at least one destination terminal, dividing the data message into a plurality of packets having at least a minimum size, and distributing the plurality of packets among the useable paths, wherein the number of paths chosen by the transmitting host router is not greater than the number of packets.

2. A method as claimed in claim 1, wherein the transmitting host receives information on the load distribution across the network and dynamically allocates the plurality of packets to the paths according to the available capacity of the paths.

3. The method as claimed in claim 1, wherein paths having an element which is loaded above a predetermined threshold are only chosen if more lightly loaded paths are not available.

4. The method as claimed in claim 3, wherein the element is a node.

5. The method as claimed in claim 3, wherein the element is a link.

6. The method as claimed in claim 3, wherein the predetermined threshold is 70 percent.

7. The method of transmitting data as claimed in claim 1, wherein each router broadcasts a load status message indicating the load status of the router and its associated links.

8. A method as claimed in claim 7 wherein the load status message indicates a range in which the load falls.

9. A method as claimed in claim 8 wherein a load status message is broadcast when the range of a load changes.

10. A router comprising:
   first means for receiving and storing network topology data;
   second means for receiving and storing network load status data;
   processor means to divide an outgoing message into packets having at least a minimum size and to allocate the packets to paths using a routing algorithm on the basis of the network topology data and the load status data, wherein the number of paths chosen by the routing algorithm is not greater than the number of packets; and
   packet header means to add a header to each packet including source and destination information and packet sequence information.

11. The router as claimed in claim 10, wherein the routing algorithm receives information on the load distribution across the network and dynamically allocates the packets to the paths according to the available capacity of the paths.

12. The router as claimed in claim 10, wherein the routing algorithm chooses paths having an element which is loaded above a predetermined threshold only if more lightly loaded paths are not available.

13. The method as claimed in claim 12, wherein the predetermined threshold is 70 percent.

14. A router comprising:
   a network map storage device for receiving and storing network topology data;
   a network status storage device for receiving and storing network load status data;
   a processor to divide an outgoing message into packets having at least a minimum size and to allocate the packets to paths using a routing algorithm on the basis of the network topology data and the load status data, wherein a number of paths chosen by the routing algorithm is not greater than a number of packets; and
   a packet header insertion device to add a header to each packet including source and destination information and packet sequence information.

15. The router as claimed in claim 14, wherein the routing algorithm receives information on the load distribution across a network topology and dynamically allocates the packets to the paths according to the available capacity of the paths.

16. The router as claimed in claim 14, wherein the routing algorithm chooses paths having an element which is loaded above a predetermined threshold only if more lightly loaded paths are not available.

17. The method as claimed in claim 16, wherein the predetermined threshold is 70 percent.

* * * * *